April 1, 1947.  J. J. ROZNER  2,418,196
NEEDLE BEARING
Filed March 26, 1945
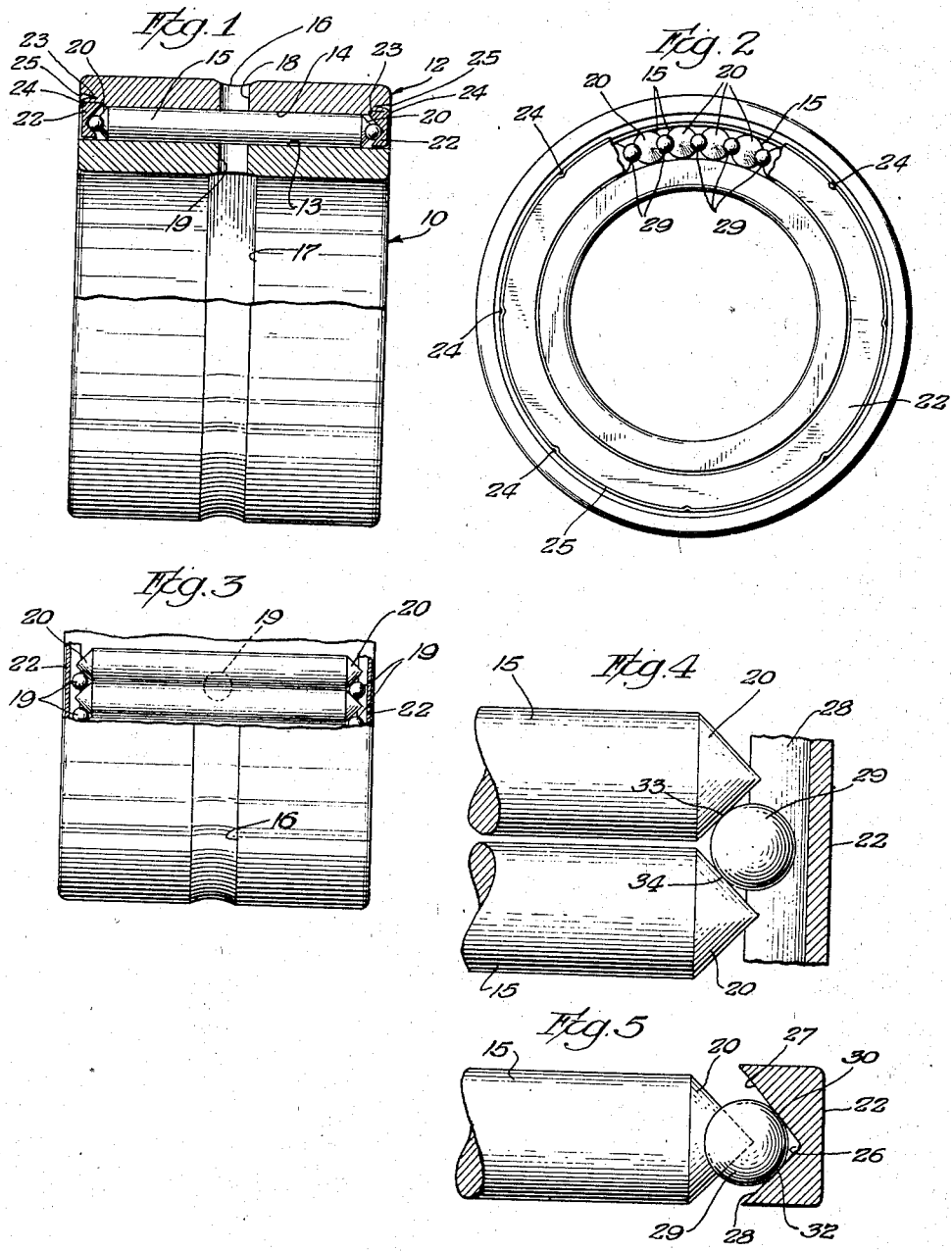
Inventor
Joseph J. Rozner
By McCaleb, Wendt & Dickinson
Attys.

Patented Apr. 1, 1947

2,418,196

UNITED STATES PATENT OFFICE 2,418,196

NEEDLE BEARING

Joseph J. Rozner, Chicago, Ill., assignor to Aetna Ball & Roller Bearing Co., Chicago, Ill., a corporation of Illinois Application March 26, 1945, Serial No. 584,915

5 Claims. (Cl. 308—206)

This invention relates to needle bearings which come within the general category of roller bearings, but are distinctive by virtue of their use of a large number of small rollers closely adjacent one another to distribute the load to a larger number of contacting surfaces.

In the presently used needle bearings, no provision is made for maintaining separation of the adjacent rollers. However, the present invention comprehends effective maintenance of small spaces between the adjacent rollers by the use of spacing elements adapted to withstand wear and limit frictional losses.

The invention also has for an object the provision of a needle bearing structure in which end thrust of and on the rollers is effectively absorbed by wear resisting parts.

Considered more specifically, this invention has for an object the provision of ball type spacer elements so disposed relative to the rollers and coacting with roller and other bearing surfaces in such a way that separation of the rollers is maintained thereby, end thrust is effectively resisted and the contact areas of the spacer balls with the rollers and bearing surfaces are so related and disposed that wear on the spacer balls is distributed well over the surfaces thereof.

Other objects and advantages will be apparent from the following description and the accompanying drawings in which similar characters of reference indicate similar parts throughout the several views.

Referring to the drawing:

Fig. 1 is a side elevational view of a needle bearing embodying a preferred form of my present invention and having a portion cut away to indicate the internal structure of the bearing in vertical section;

Fig. 2 is an end elevational view of the bearing shown in Fig. 1 with a portion cut away to indicate the positions of certain parts within the bearing;

Fig. 3 is a fragmentary side view of the bearing with a portion cut away to indicate internal parts of the bearing as they appear in plan;

Figs. 4 and 5 are fragmentary views to an enlarged scale which illustrate details of the structure of the bearing shown in Figs. 1 and 2.

Having reference to the drawings which disclose an exemplary embodiment of my invention, the needle bearing therein shown has an inner race 10 and an outer race 12 which provide respectively outer and inner bearing surfaces 13 and 14 between which a series of relatively small bearing rollers 15 are mounted in closely spaced relation circumferentially of the races. As is usual in bearings of the type disclosed, the outer race has a circumferential lubricant channel 16 in the outer surface thereof and the inner channel has a similar circumferential channel 17 in the inner surface thereof through which lubricant may flow to the bearing surfaces. Passages 18 and 19 extending through the outer and inner races, respectively, are provided for the flow of lubricant from either or both of the channels 16 and 17 to the bearing surfaces.

It is characteristic of needle bearings that the rollers are considerably smaller than those used in the usual type of roller bearings and are closely spaced so that the load on the bearing is distributed between a relatively large number of bearing surfaces. In most of the presently used forms of needle bearings, no provision is made for the separation of the rollers circumferentially of the races although it is usual to provide some means for confining the rollers axially between the races.

In the bearing disclosed, the rollers 15 have at each end an axially projecting conical surface 20, which conical surfaces have linear sides and are concentric with the axis of the roller. It is understood in the present instance that if desired, the conical end surfaces might be frustoconical if a sufficient amount of the projecting tapered surface were provided to accomplish the intended purpose.

In opposition to the conical end surfaces of the rollers and the opposite ends of the bearing, end rings 22 are secured to one of the races for rotation therewith, which end rings extend across the space between the races to close proximity with the other race. As disclosed herein, the end rings 22 fit into recesses 23 at the outer ends of the inner surface of the outer race and are secured therein by swaging the outer race over the edge of the end rings, at circumferentially spaced positions, as indicated at 24. To facilitate the swaging of the outer race to hold the end rings firmly in position, the ends of the race are tempered by induction, flame or other suitable heating process sufficiently to permit the swaging and the desirable provision of annular grooves 25.

On their inner surfaces in spaced and opposed relation to the conical ends of the rollers 15, the end rings 22 have V-shaped annular grooves 26 concentric with the bearing surfaces of the races. When viewed in section taken radially of the rings as shown in Figs. 1 and 5, the side surfaces 27 and 28 of the groove 26 are linear. The included angle between the side surfaces 27 and 28 is desirably as large or somewhat larger than the included angle of the conical end surfaces 20 of the rollers. The side surfaces 27 and 28 of the grooves in the end rings are equi-angularly displaced on opposite sides of the roller axes and their vertices fall on the longitudinal axes of the rollers. The conical ends of the rollers thus provide a series of circumferentially displaced surfaces while the end rings present concentric annular surfaces which are angularly displaced in a radial direction and opposed to the conical ends of the rollers.

Confined within the spaces thus defined between the conical end surfaces of the rollers and the annular grooves of the end rings and in contact with the opposed surfaces thereof, are a series of spacer balls 29 adapted to hold the rollers in their proper spaced relation and withstand the end thrust of the rollers. The spacer balls 29 are of a smaller diameter than that of the rollers 15 and one is provided between each adjacent pair of rollers at each end of the bearing.

Since the sides 27 and 28 of the grooves 26 are equiangularly disposed with respect to the longitudinal axes of the rollers 15 and the vertices of the grooves fall on the roller axes, the spacer balls 29 each engage the end rings at two points 30 and 32 which are displaced from the vertices of the grooves 26. The displacement of the points of contact of each ball with one of the end rings is in a plane extending radially of the ring. In a transverse plane substantially perpendicular to that including the points of contact with each end ring, each of the balls 29 engages two of the conical end surfaces of the rollers at points 33 and 34 which are spaced in a direction circumferentially of the bearing.

Thus, with proper spacing between the end rings, the balls 29 engage the adjacent conical end surfaces of the rollers and are axially confined by engagement with both of the angularly disposed surfaces of the annular grooves in the end rings to determine the positions of the rollers axially of the bearing and also to establish their circumferentially spaced positions.

During the operation of the bearing the turning of the rollers about their longitudinal axes tends to rotate the spacer balls 29 about an axis parallel to the axes of the rollers. However, as the rollers and balls progress circumferentially about the outer surface of the inner race and relative movement occurs between the spacer balls 29 and the end rings, the engagement of the balls with the surfaces of the end rings tends to turn the balls about axes which are generally radial with respect to the bearing races.

The opposed forces of the conical end surfaces of the rollers and the surfaces of the end rings being equal, it is desirable that the areas of contact between the spacer balls and the conical end surfaces of the rollers shall be equal to the areas of contact between the spacer balls and the surfaces of the end rings so that the resulting frictional forces of the rollers and the end rings which tend to rotate the balls in different directions are practically equal. By this combination of forces the resulting rotation of the spacer balls 29 is complex and such that the balls do not follow any particular well defined pattern of rotation and the wear over the ball surfaces is even.

In the disclosed embodiment of the invention the areas of contact between the spacer balls 29 and the conical end surfaces of the rollers are practically equalized with those between the spacer balls and the surfaces of the end rings by the provision of surfaces which are linear in section as described. It may be understood that the equalized and opposing areas of contact with the spacer balls might be provided by surfaces having contours other than those disclosed but the problem of equalizing the areas would be more complex.

With parts of the preferred type such as those disclosed, the assembly of the needle bearing by which the desired relation of parts is effected, is quite simple; that is, with the races and rollers assembled together with the rollers extending vertically, one set of spacer balls 29 is put in place between the adjacent end surfaces of the rollers and the end ring at the upper end secured to the outer race by swaging the grooved end surface of that race. The position of the bearing is then reversed and a similar procedure followed with the other end uppermost and with the application of sufficient force in the swaging operation to effect the proper engagement of the spacer balls with the opposed surfaces of engagement and equal spacing of the rollers one from the other.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A needle bearing comprising, in combination, inner and outer races, a series of rollers disposed in closely spaced relation between said races, and having conical end surfaces, a pair of oppositely disposed end rings secured to one of said races in spaced relation to the conical ends of said rollers, said end rings each having annular V-shaped grooves therein facing the conical ends of the rollers with the vertices of the grooves in alignment with the axes of the rollers, the included angles of the grooves being practically equal to that of the conical ends of the rollers, a series of spacer balls at each end of the rollers of a diameter less than that of the rollers, and each engaging the conical ends of adjacent rollers to maintain a predetermined spacing between the rollers, each of said balls also engaging both surfaces of one of said grooves to establish the position thereof axially of the rollers, the engaging surfaces of said balls with the conical ends of said rollers being substantially equal in area and disposed in a plane transverse to the surfaces of contact between said balls and the surfaces of said groove so that the rolling motions of said balls are such as to distribute the wear over the surfaces thereof.

2. A needle bearing comprising, in combination, inner and outer races, a series of rollers disposed in closely spaced relation between said races, said rollers having conical end surfaces, said conical end surfaces having linear edges when viewed in sections taken through the axes of the rollers, a pair of end rings secured to one of said races in spaced relation to the conical ends of said rollers, said end rings each having an annular V-shaped groove therein facing the conical ends of the rollers, the surfaces of said grooves being linear when viewed in a section radially of the rings, the vertices of said grooves being aligned with the longitudinal axes of the rollers, a series of spacer balls at both ends of the rollers, each disposed between and engaging the ends of adjacent rollers to hold the rollers in predetermined spaced relation, each of said balls being held in position between said rollers by engagement with both sides of one of said V-shaped grooves.

3. A needle bearing comprising, in combination, inner and outer races, a series of rollers disposed in closely spaced relation between said races, said rollers having conical end surfaces, said conical end surfaces having linear edges when viewed in sections taken through the axes of the rollers, a pair of end rings secured to one of said races in spaced relation to the conical ends of said rollers, said end rings each having an annular V-shaped groove therein facing the conical ends of the rollers, the surfaces of said grooves being linear when viewed in a section radially of the rings, the vertices of said grooves being aligned with the longitudinal axes of the rollers and the sides of said grooves being equi-angularly disposed with respect to the longitudinal axes of the rollers, a series of spacer balls at both ends of the rollers each disposed between and engaging the ends of adjacent rollers to hold the rollers in predetermined spaced relation, each of said balls being held in position between said rollers by engagement with both sides of one of said V-shaped grooves.

4. A needle bearing comprising, in combination, inner and outer races, a series of rollers between said races and closely spaced relative to one another, said rollers each having extending end surfaces linearly tapered inwardly toward the roller axis and concentric relative to said axis, end rings secured to one of the races and spaced from said end surfaces of the rollers, said end rings having annular surfaces which are linear in section radially of the rings, said surfaces being equi-angularly disposed in acute angular relationship with respect to the longitudinal axes of the rollers, series of spacer balls at the ends of the rollers each disposed between and engaging the ends of adjacent rollers to hold the rollers in predetermined spaced relation, each of said balls being held in position between said rollers by engagement with said surfaces of the end rings, said surfaces of the end rings confining the balls in one plane and said end surfaces of the rollers confining the balls in a plane perpendicular to the last mentioned plane.

5. A needle bearing comprising, in combination, a pair of races, a series of rollers between said races and closely spaced relative to one another, said rollers each having angularly disposed projecting end surfaces concentric to the longitudinal axis of the roller, end rings secured to one of the races and having annular grooves therein facing the ends of the rollers and spaced therefrom, a series of spacer balls at each end of the rollers, each of said balls being disposed between and engaging the projecting end surfaces of said rollers and engaging the surfaces of one of said grooves at spaced points, the spacing and shapes of the surfaces of said projecting ends of the rollers and the surfaces of said grooves being such and so related to the size of said balls that the areas of contact between the balls and roller surfaces are substantially equal to the areas of contact between the balls and groove surfaces whereby a complex rolling motion of the balls is produced during the use of the bearing to even the wear over the surfaces of the balls.

JOSEPH J. ROZNER.

REFERENCES CITED

The following references are of record in the file of this patent:

UNITED STATES PATENTS

| Number | Name | Date |
|---|---|---|
| 796,995 | George | Aug. 15, 1905 |
| 1,091,830 | George | Mar. 31, 1914 |
| 503,296 | Susemihl | Aug. 15, 1893 |
| 662,373 | Dooley | Nov. 20, 1900 |
| 822,297 | Newton | June 5, 1906 |